March 11, 1924.
P. NAGLE
MOTOR VEHICLE ATTACHMENT
Filed Dec. 19, 1922
1,486,356
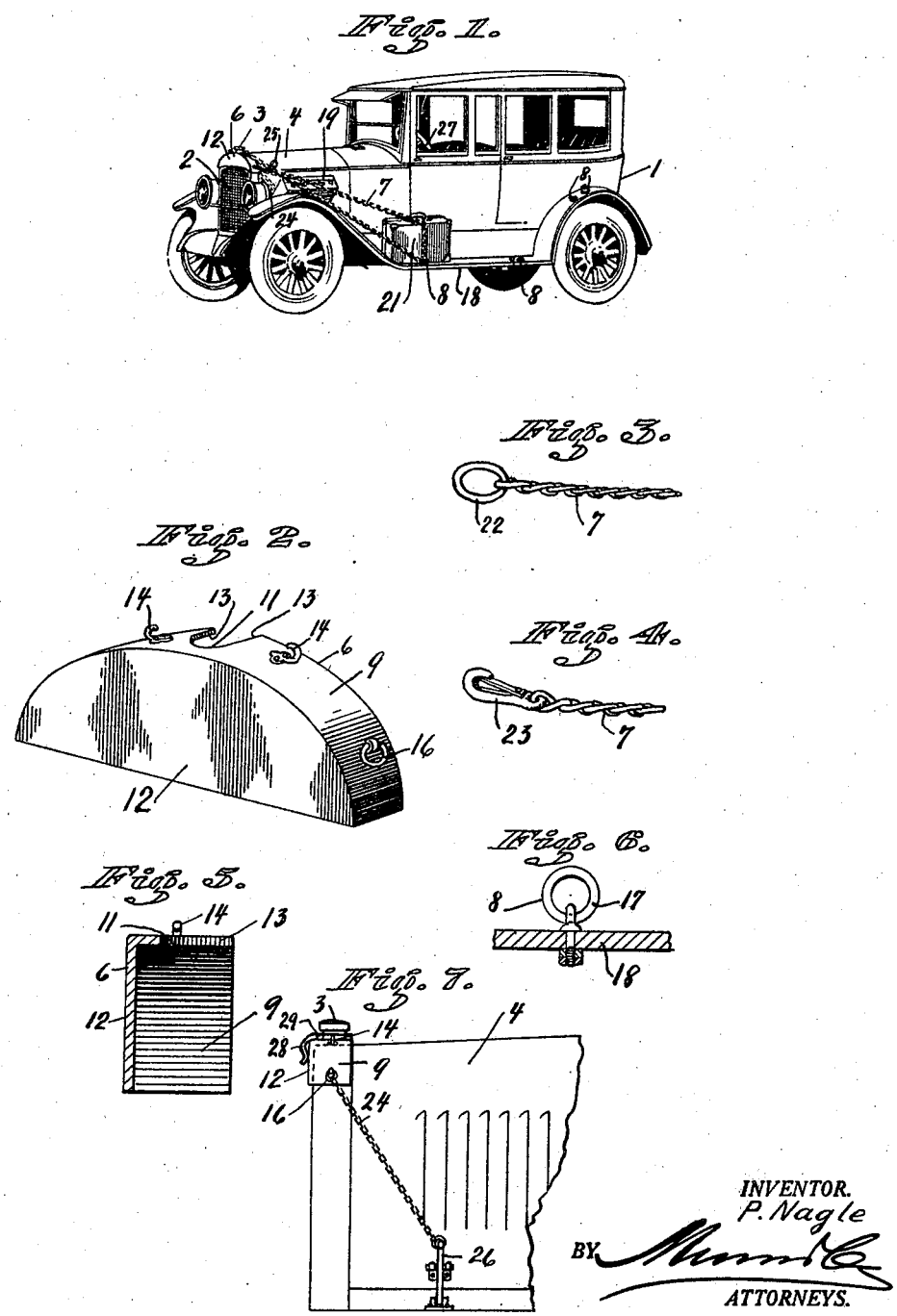
INVENTOR.
P. Nagle
BY
ATTORNEYS.

Patented Mar. 11, 1924.

1,486,356

UNITED STATES PATENT OFFICE.

PATRICK NAGLE, OF SAN FRANCISCO, CALIFORNIA.

MOTOR-VEHICLE ATTACHMENT.

Application filed December 19, 1922. Serial No. 607,858.

*To all whom it may concern:*

Be it known that I, PATRICK NAGLE, a citizen of the Dominion of Canada, and a resident of San Francisco, county of San Francisco, State of California, have invented a new and useful Motor-Vehicle Attachment, of which the following is a specification.

The present invention relates to improvements in motor vehicles and has particular reference to an attachment for motor vehicles for facilitating the carrying of a number of satchels, bundles, surveying tools, camping outfits, and other objects on the motor vehicle. It is particularly proposed to provide a very simple means of this character that may be readily applied and readily detached when its use is not desired and that is very substantial. The main principle involved in the present invention is the utilizing of the upper portion of the radiator of a motor vehicle for furnishing support against rearward pull to a hood formed to lie against the upper front end of the radiator and to use this hood as a means for attaching a chain or other flexible member thereto, the chain being adapted to be wound through or around a number of packages to be carried, to be engaged by a support provided rearwardly of the radiator and to be returned to the hood previously referred to.

The preferred form of the invention is illustrated in the accompanying drawing, in which Figure 1 shows a perspective view of a motor vehicle having my attachment secured thereto, Figure 2 a perspective detail view of a hood forming part of my attachment; Figures 3 and 4 opposite ends of a chain used for my attachment; Figure 5 a central vertical section through the hood; Figure 6 a detail view of one additional supporting member for the chain; and Figure 7 a detail view of a fragmentary front portion of the motor vehicle showing means for holding the hood in place. While I have shown only the preferred form of the invention it should be understood that various changes or modifications may be made within the scope of the claims hereto attached without departing from the spirit of the invention.

The motor vehicle (1) shown in Figure 1 is constructed along well known lines terminating at its front end in the radiator (2), the upper portion of which is curved and provided with a neck (3) through which water may be introduced into the radiator. The power plant for the motor vehicle is disposed rearwardly of the radiator in the usual manner and covered by the engine hood (4).

My attachment comprises as its principal members a hood (6) adapted to be placed over the upper front edge of the radiator, a chain (7) secured thereto and a plurality of chain engaging members (8) distributed over the motor vehicle in various convenient places rearwardly of the radiator. The hood (6) is shaped to conform to the shape of the top of the radiator, that is, it is provided with a curved sheet of metal (9) recessed centrally as shown at (11) to fit around the neck (3) of the radiator and a front plate (12) secured thereto adapted to lie against the front edge of the radiator. The recess (11) may be made with straight lateral edges (13) as shown in the drawing so as to be able to be slipped over the neck from in front, or it may be made circular to fit around the neck, in which latter case it would have to be slipped over the neck from the top. To the hood is secured on either side of the neck a hook (14) extending preferably in a lateral and rearward direction, and a ring (16) near its lower edge.

The additional supporting members (8) previously mentioned may be secured at any desired places, as for instance on running board or the fenders, and preferably consist of rings (17) secured to the support (18) in a manner shown in Figure 6 or in any other suitable manner.

To secure a number of satchels or packages or the like to the motor vehicle the same may be placed between the engine hood and the fender as shown at (19) or on the running board as shown at (21), and the chain (7) which at one end is provided with a ring (22) is fastened on the hook (14), guided through the handles of the satchels or engaged with the same in any other suitable manner, passed through one of the additional supports (8), whichever happens to be in the most convenient position, and returned to engage with its snap (23) provided at the other end, either the ring (16) on the hood (6) or any intermediate link of the chain, if it is too short to reach the ring (16).

If no packages are carried, and it is desired to retain my hood attachment, the same may be held in the manner shown in Figure 7, that is by means of a second short chain (24) engaging at one end the ring (16) and at the other end one of the hooks (26) ordinarily used to hold the engine hood in place.

It should be understood that to prevent the baggage carried from being stolen a padlock (25) might be employed for the chain. The latter could also be used for locking the automobile by being led from one of the supporting members (8) through and around the steering wheel (27) and back to another supporting member (8).

In case it is desired to eliminate the chains (24) the hood (6) might be held in place by means of a spring clamp (28) comprising a collar (29) adapted to be slipped over the neck of the radiator and a curved spring member extending forwardly and downwardly from the same adapted to bear on the front end of the hood.

I claim:

1. An attachment for a motor vehicle having a radiator at its front end with a neck rising therefrom, comprising a flexible member and a hood bearing against the front edge of the radiator and recessed to engage the neck having the flexible member secured thereto.

2. An attachment for a motor vehicle having a radiator at its front end with a neck rising therefrom, comprising a flexible member and a hood formed to correspond to the shape of the top portion of the radiator bearing against the front edge of the latter and recessed to engage the neck having the flexible member secured thereto.

3. An attachment for a motor vehicle having a radiator at its front end with a neck rising therefrom, comprising a flexible member, a hood bearing against the front edge of the radiator and recessed to engage the neck, and means secured to the motor vehicle rearwardly of the radiator providing an additional point of attachment for the flexible member.

4. An attachment for a motor vehicle having a radiator at its front end with a neck rising therefrom, comprising a flexible member, a hood formed to correspond to the shape of the top portion of the radiator bearing against the front edge of the radiator and recessed to engage the neck, and means secured to the motor vehicle rearwardly of the radiator providing an additional point of attachment for the flexible member.

PATRICK NAGLE.